(12) United States Patent
Rivas Sánchez

(10) Patent No.: US 11,247,788 B2
(45) Date of Patent: Feb. 15, 2022

(54) CONNECTION/SEPARATION DEVICE FOR SEPARATING SATELLITES FROM SHUTTLES OR FROM SATELLITE DISPENSERS

(71) Applicant: AIRBUS DEFENCE AND SPACE S.A., Madrid (ES)

(72) Inventor: Francisco Javier Rivas Sánchez, Madrid (ES)

(73) Assignee: AIRBUS DEFENCE AND SPACE S.A., Madrid (ES)

( * ) Notice: Subject to any disclaimer, the term of this patent is extended or adjusted under 35 U.S.C. 154(b) by 268 days.

(21) Appl. No.: 16/470,860

(22) PCT Filed: Dec. 22, 2016

(86) PCT No.: PCT/ES2016/070931
§ 371 (c)(1),
(2) Date: Jun. 18, 2019

(87) PCT Pub. No.: WO2018/115540
PCT Pub. Date: Jun. 28, 2018

(65) Prior Publication Data
US 2019/0322394 A1 Oct. 24, 2019

(51) Int. Cl.
*B64G 1/64* (2006.01)
*B64G 1/10* (2006.01)

(52) U.S. Cl.
CPC .............. *B64G 1/645* (2013.01); *B64G 1/10* (2013.01)

(58) Field of Classification Search
CPC .......... B64G 1/645; B64G 1/10; B64G 1/641; B64G 2001/643; B64G 1/64; F16B 2200/509; F16B 2/06; Y10T 403/11
See application file for complete search history.

(56) References Cited

U.S. PATENT DOCUMENTS

| | | | | |
|---|---|---|---|---|
| 1,943,256 A | * | 1/1934 | Durr | B64C 1/08 52/650.2 |
| 3,362,290 A | * | 1/1968 | Carr | F42B 15/38 89/1.14 |

(Continued)

FOREIGN PATENT DOCUMENTS

| | | |
|---|---|---|
| EP | 0267279 A1 | 5/1988 |
| EP | 0768241 A1 | 4/1997 |

(Continued)

OTHER PUBLICATIONS

International Search Report and Written Opinion for PCT/ES2016/070931, dated Sep. 14, 2017.

*Primary Examiner* — Medhat Badawi
*Assistant Examiner* — Vicente Rodriguez
(74) *Attorney, Agent, or Firm* — Merchant & Gould P.C.

(57) ABSTRACT

A connecting-separating device is for separating satellites from launchers or satellite dispensers. Circumferentially aligned clamps can be coupled on their inner face on rings of separable elements constituting the union interface between the two separable elements. A release mechanism connects two of the clamps through one of the ends of the clamps. The two clamps are connected by the release mechanism include a protrusion protruding from their outer faces at the end opposite the end connecting with the release mechanism. The rest of the clamps include a protrusion protruding from their outer faces at each of their ends adjacent the adjacent clamps, so that each pair of clamps adjacent and not connected to one another by the release mechanism are connected to one another by connectors connecting the protrusions.

9 Claims, 5 Drawing Sheets

(56) References Cited

U.S. PATENT DOCUMENTS

| | | | | |
|---|---|---|---|---|
| 3,458,217 | A | * | 7/1969 | Pride, Jr. .............. F16L 23/08 |
| | | | | 285/3 |
| 5,108,049 | A | | 4/1992 | Zinovi |
| 5,860,624 | A | * | 1/1999 | Obry .................. F42B 12/60 |
| | | | | 244/39 |
| 6,021,715 | A | * | 2/2000 | Fritz .................. F42B 15/38 |
| | | | | 102/275.11 |
| 6,076,467 | A | * | 6/2000 | Cespedosa ........... B64G 1/641 |
| | | | | 102/377 |
| 6,357,699 | B1 | * | 3/2002 | Edberg ................ B64G 1/641 |
| | | | | 102/377 |
| 6,454,214 | B1 | * | 9/2002 | Smith ................. B64G 1/641 |
| | | | | 102/377 |
| 2003/0133748 | A1 | * | 7/2003 | Buder ................. B64G 1/641 |
| | | | | 403/374.1 |
| 2009/0294589 | A1 | * | 12/2009 | Berry ................... B64C 5/06 |
| | | | | 244/123.1 |

FOREIGN PATENT DOCUMENTS

| | | | |
|---|---|---|---|
| EP | 0905022 | A1 | 3/1999 |
| EP | 1944237 | A1 | 7/2008 |
| WO | 2014/019330 | A1 | 2/2014 |

\* cited by examiner

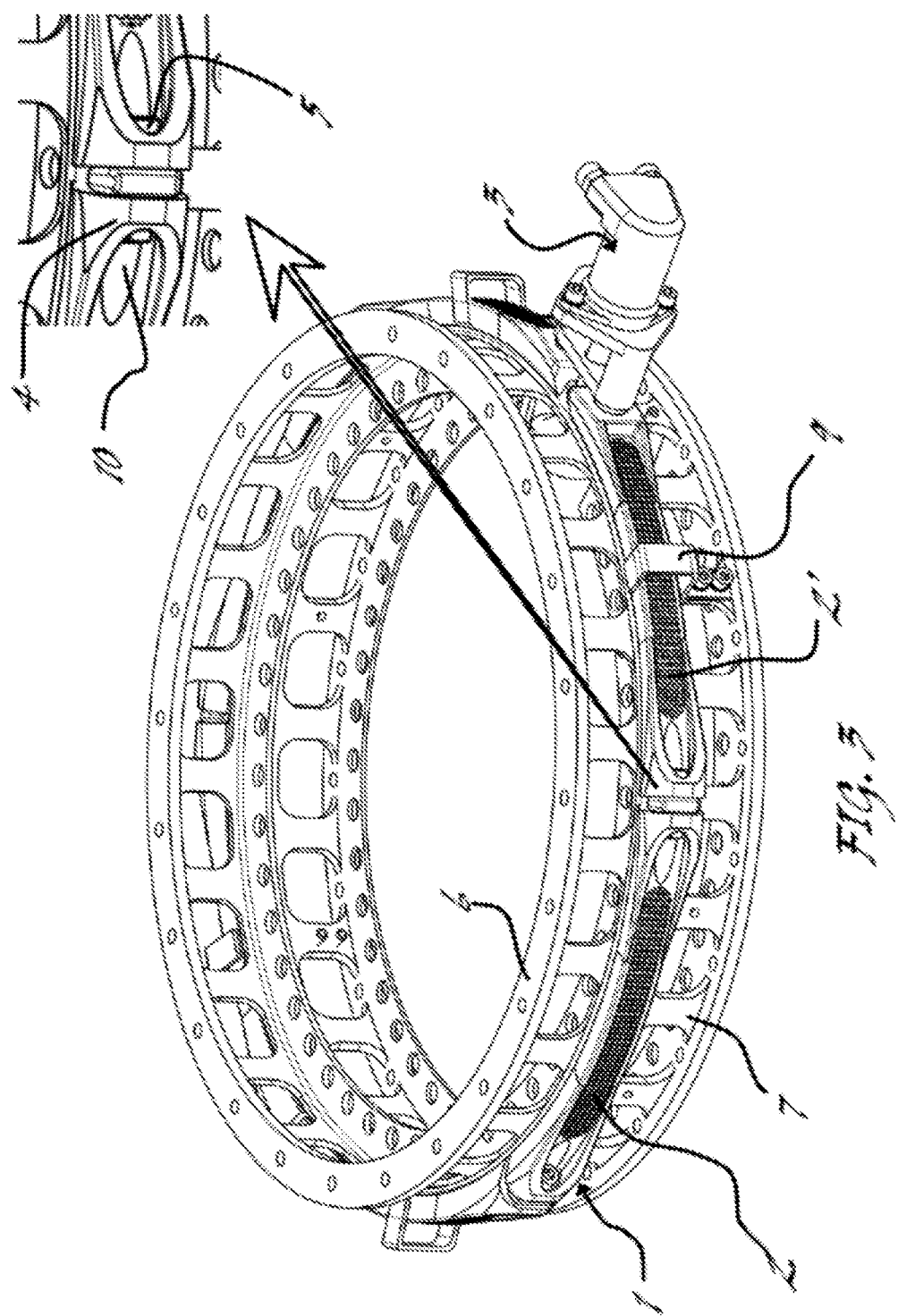

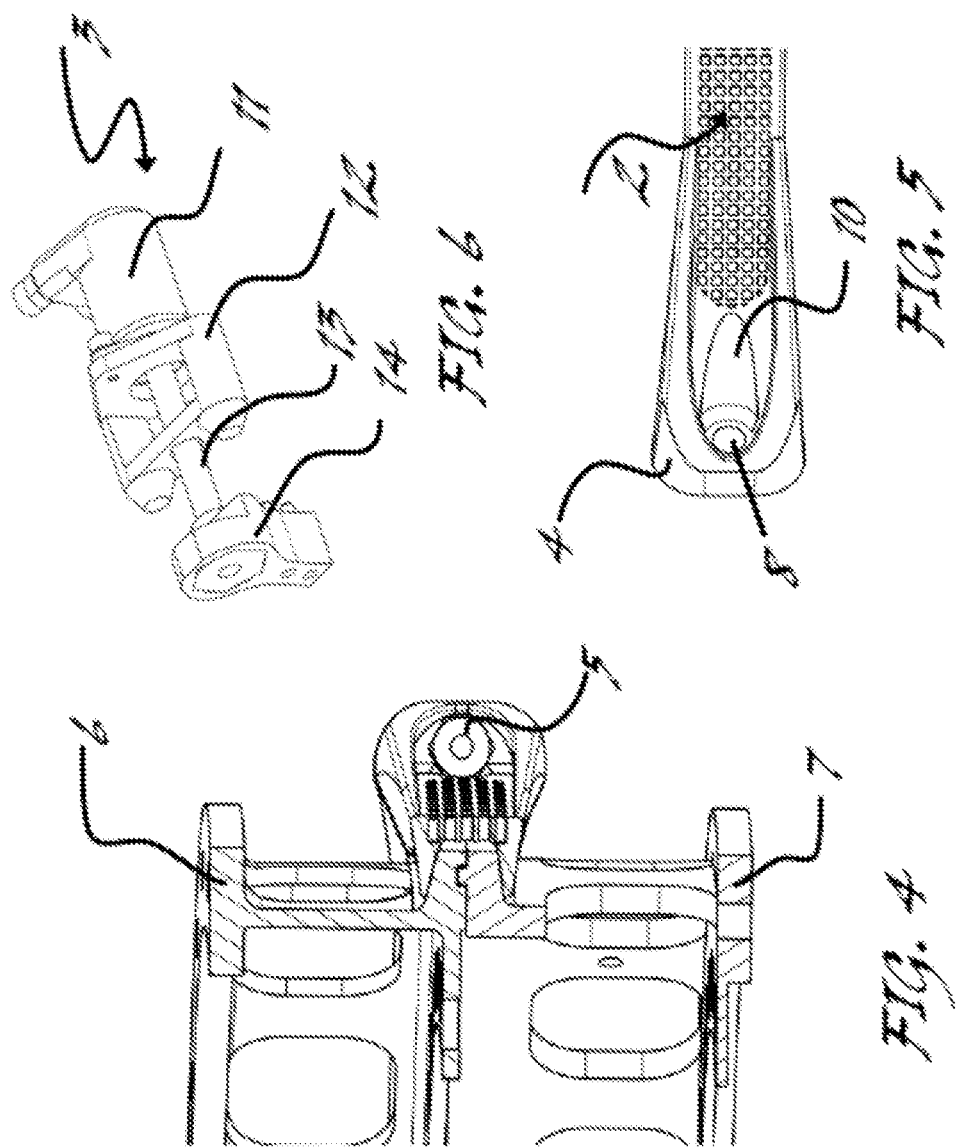

CONNECTION/SEPARATION DEVICE FOR SEPARATING SATELLITES FROM SHUTTLES OR FROM SATELLITE DISPENSERS

This application is a National Stage Application of PCT/ES2016/070931, filed Dec. 22, 2016, which application is incorporated herein by reference. To the extent appropriate, a claim of priority is made to the above-disclosed application.

FIELD OF THE INVENTION

The present invention relates to a connection/separation device for satellites which have to be separated during the flight, for example from a launcher or from a satellite dispenser.

BACKGROUND OF THE INVENTION

Various systems are known with means for separating parts of a spacecraft. One of these prior art systems is the clamping connection assembly for spacecrafts described in EP 0267279 A1. This clamp joins two separable parts of a spacecraft, each one of which has a bevelled rim which has grooves on its circumference. The clamp comprises retainers internally configured to match the rims of the said separable parts and joined by means of a tensioning band, each retainer including a shearing pin which engages in a corresponding groove of the said rims and transmits loads directly between the two separable parts of the spacecraft.

Another system for attaching and separating satellites is described in EP 0768241 A1. It comprises a fastening piece which is screwed to the upper ring of the adaptor of the launch rocket, a tensioning strip consisting of a two-part metal band, curved metal pieces for fastening the satellite which have a thin-walled cylindrical body with a metal rotational shaft in its lower part formed by several lugs and which rest via their upper part on the lower ring of the satellite, surrounding it and pressing on it, and pressing cams which each have two rotational shafts, one coinciding with that of said metal pieces and the other shared with said piece. The aim of this system is to simplify the securing of the satellite to the launch rocket and its release upon entering into orbit.

EP 0905022 A1 describes a system for attaching and separating satellites which comprises an open ring or metal band which has a channel formed in its inner perimeter, in which jaws are integrated in a discontinuous way, which can slide in the said channel, two end pieces fixed to the ends of the said ring, a tensioning bolt which joins the two end parts, and three supports for retaining the ring which are fixed to the structure of the launcher of a satellite.

EP 1944237 A1 relates to an apparatus for connecting/separating a launch vehicle and a satellite, comprising a strip with an inner channel which slidably houses a plurality of clamps, which is applied against rings that form the connection interface between the two vehicles. The apparatus also comprises means for radially tightening the assembly comprising the strip and clamps, and a device for joining/separating the ends thereof, which, together with locking and unlocking means, includes a mechanism that enables the controlled opening of the strip in two phases, namely: a first phase in which the ends move with contact being maintained with the rings, thereby dissipating the elastic energy corresponding to the tightening of the strip by means of friction; and a second phase in which the strip separates from the rings until a parking position is reached.

Most of these connection/separation systems with a tensioning band are indicated when the load per length unit to be transmitted is high. However, in certain situations (for example, for satellites with little weight, or when the connection/separation system must coexist with the element to be separated during a large part of the mission) the relatively high weight of the connection/separation system may cause problems (for example, the mass available for the satellite itself may be reduced).

SUMMARY OF THE INVENTION

The object of the invention is to provide a connection/separation device for elements of a spacecraft or a launcher which is light, in turn allowing a homogeneous tension over the whole perimeter of the connection interface between the two separable elements.

The invention provides a connection-separation device for separating satellites from launchers or satellite dispensers comprising:

A plurality of clamps circumferentially aligned and attachable on their inner face to the rings of the separable elements constituting the union interface between the two separable elements, and A release mechanism connecting two of the clamps at one end of said clamps, wherein the two clamps connected by the release mechanism comprise a protrusion protruding from their outer faces at the end opposite the end connecting with the release mechanism, and wherein the rest of the clamps comprise a protrusion protruding from its outer face at each of their ends adjacent the adjoining clamps, so that each pair of clamps adjacent and not connected to each other by the release mechanism are connected to one another by connecting means connecting said protrusions.

The design of the connection-separation device of the invention allows homogenous tensioning around the perimeter of the union interface between the two separable elements, and lacking additional elements (such as an outer band) it achieves a lighter system.

Thus, the proposed solution is very suitable when the weight is a conditioning factor (for example, for missions with microsatellites and minisatellites).

Another advantage of the invention is that, as the load is distributed throughout all the perimeter of the interface, point loads and therefore local reinforcements in the structure are avoided, optimizing the weight of the structure.

Another advantage is the reduction of the shock because the release mechanism forces a slow opening of the band compared to a traditional system.

Further advantageous embodiments will be described in the dependent claims.

BRIEF DESCRIPTION OF THE FIGURES

For a better understanding of the present invention, this will be described in more detail below, with reference to the accompanying drawings, in which:

FIG. 3 is a perspective view of the connection/separation device of the invention mounted on the rings forming the interface of connection between the two separable elements.

FIG. 4 is a detail view of the connection/separation device of the invention on the rings forming the interface of connection between the two separable elements.

FIG. 5 is a detail view of one end of a clamp of the connection-separation device of the invention.

FIG. 6 is a perspective view of a release mechanism of the connection-separation device of the invention.

DETAILED DESCRIPTION OF THE INVENTION

Figure 1:
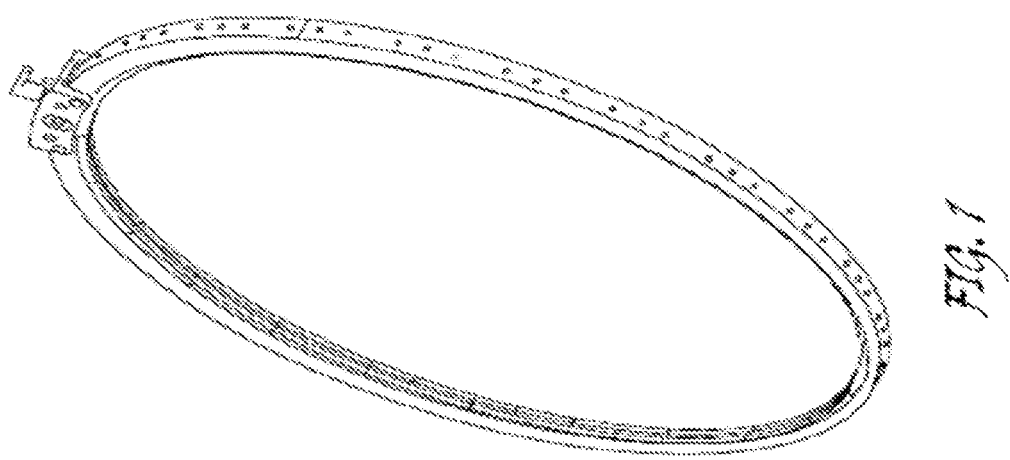
FIG. 1 shows a view of a prior art band-clamp assembly with a joining-separating mechanism of the ends of the band.

FIG. 1 represents a prior art band-clamp assembly with a joining-separating mechanism for the ends of the band. As it can be seen in said figure, this device has an outer band with an inner channel in which a plurality of clamps are located.

Said device corresponds to the applicant's separation system, known as LPSS (Low-shock/Large Payload Separation System), of EP 1944237 A1, suitable for heavy loads.

Figure 2:
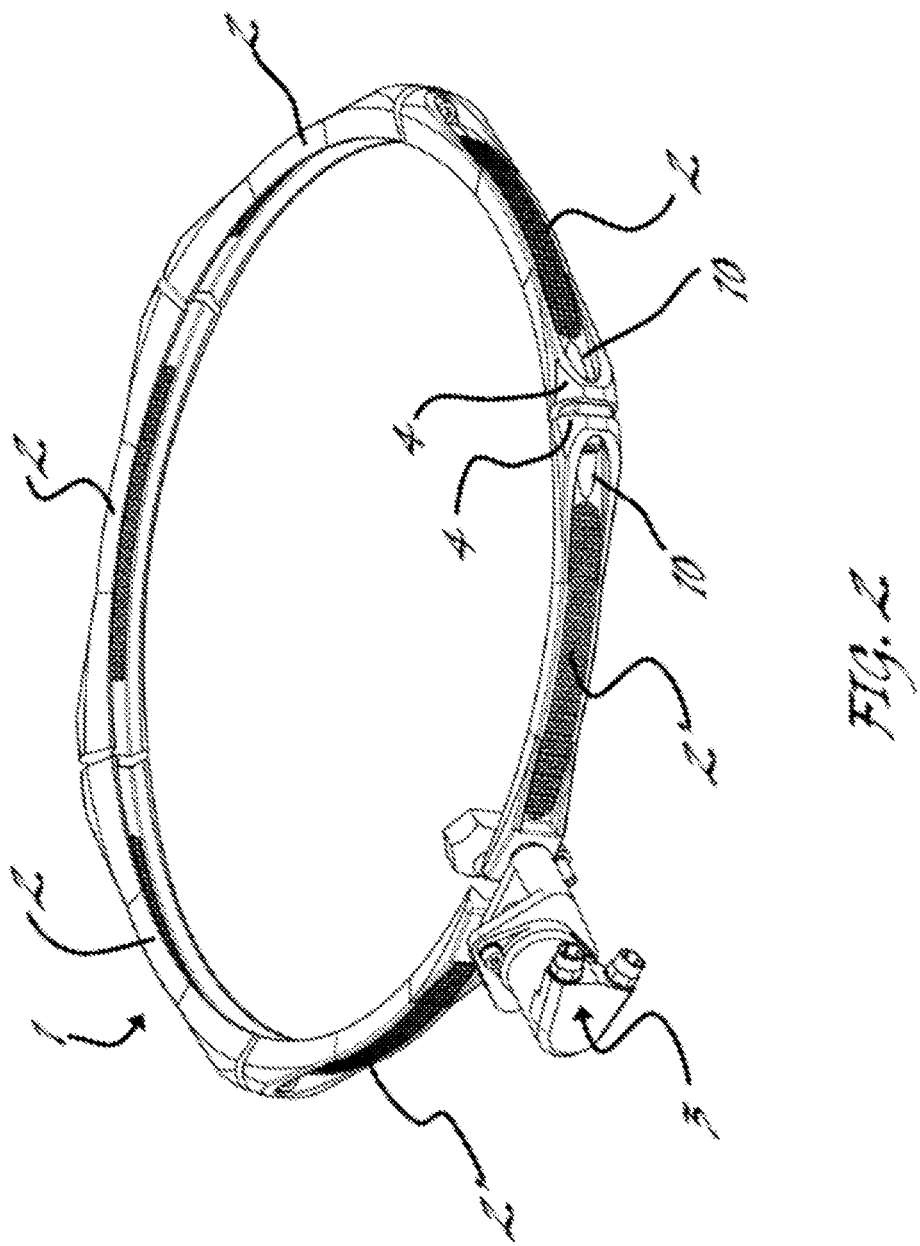
FIG. 2 is a perspective view of the connection/separation device of the invention.

FIG. 2 shows a perspective view of the connection/separation device 1 of the invention. It is noted that the device comprises a plurality of circumferentially aligned clamps 2, 2', the number of which depends on the diameter of the interface. As best seen in FIGS. 2, 3 and 4, these clamps 2, 2' can be coupled on their inner face on rings 6, 7 of the separable elements constituting the union interface between the two separable elements. The connection/separation device 1 of the invention also comprises a release mechanism 3 which connects two of the clamps 2' through one of the ends of said clamps 2'. The two clamps 2' connected by the release mechanism 3 comprise a protrusion 4 protruding from their outer faces at its end opposite the end connecting with the release mechanism 3. The remaining clamps 2 have, at each of their adjacent ends to the contiguous clamps 2, 2', a protrusion 4 protruding from its outer face. FIGS. 2, 3 and 4 show that the adjacent clamps 2 are connected to each other or to the clamps 2' by connecting means 5 joining their respective protrusions 4.

In the embodiment of FIGS. 2 to 7 it can be seen that the protrusions 4 of the ends of the clamps 2 (also located at one of the ends of the clamps 2') have a through hole 8. Also the attachment means 5 implemented in said embodiment are tangentially arranged screw and nut systems passing through the through holes 8 of the protrusions 4 to connect the corresponding adjacent clamps 2, 2'. These connecting means 5 enable the connection/separation device 1 of the invention to be tensioned conveniently.

In FIGS. 3 and 5 it can be seen that the clamps 2, 2' have recessed areas 10 on their external face and in the vicinity of the protrusions 4, capable of accommodating the connecting means 5.

FIG. 3 shows a device 9 for receiving the clamps 2, 2' upon releasing the connection/separation device 1 of the invention. Said device 9 is only attached to the ring 7 of the separable elements, and comprises a housing or receptacle which receives the clamps 2, 2' on falling. Several of these devices 9 are angularly spaced from each other to receive the clamps 2, 2'.

In order that the connection/separation device 1 of the invention is more rigid, it is possible to insert additional elements, as filler elements (see FIG. 3) between the protrusions 4 of the ends of the contiguous clamps 2, 2', thus providing continuity and a general shape closer to a ring. Said filler elements may be of a viscoelastic material.

The clamps 2, 2' may have an internally hollow cross-section, which allows the weight of the assembly to be lightened. For that purpose they can be manufactured using Additive Layer Manufacturing (ALM) technologies.

Likewise, the clamps 2, 2' may comprise an area with grid-like holes (see FIGS. 2, 3 and 5), which also allows the weight of the assembly to be lightened.

Figure 7A:
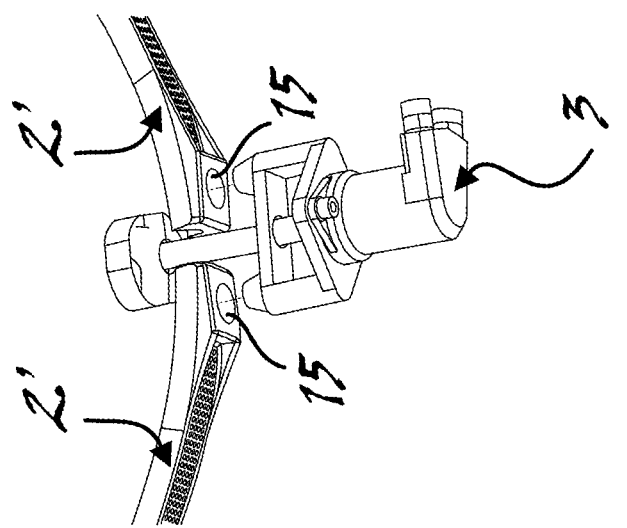
FIG. 7A is a perspective view of the release mechanism of FIG. 6 mounted on the two corresponding clamps of the connection-separation device of the invention and FIG. 7B is a partially exploded view of the release mechanism.
Figure 7B:
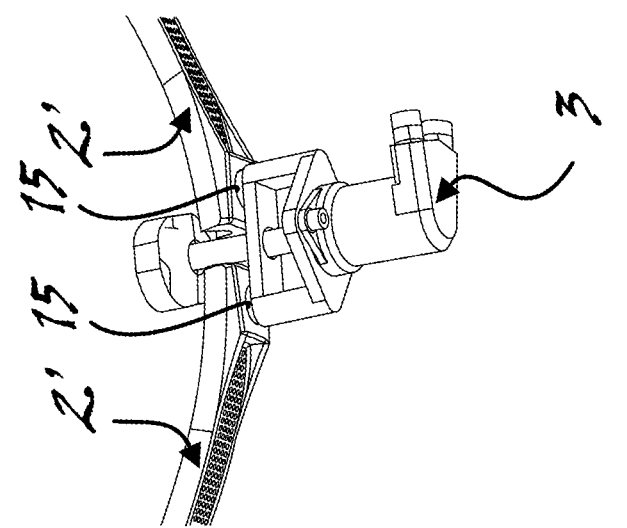

FIGS. 7A and 7B show the release mechanism 3, located between the clamps 2'. A shape memory material (SMA, or Shape Memory Alloy) may be used in the release mechanism 3, so that when current is applied it is heated and its crystalline state changes, allowing the release mechanism 3 to be opened.

The release mechanism 3 allows a controlled release for the reduction of the shock generated during the deployment of the connection/separation device 1 of the invention itself. The shock is less than in the existing low shock bands.

The release mechanism 3 (see FIGS. 2, 6, 7A and 7B) is composed of a release element 11 itself which may be pyrotechnic or non-explosive (SMA, fushing, etc.), which holds a bolt 13 which maintains a bridge 12 is in position when the load of the bolt 13 reacts on the lower ring 7 through a dolly 14. The bridge 12 has two male conical contacts which are received in the corresponding conical holes 15 of the clamps 2' (FIGS. 7A and 7B). The tension of the connection/separation device 1 is slowly relaxed through the sliding between the male cone of the bridge 12 and the female cone of the clamps 2', thereby obtaining a passive shock reduction system.

In FIGS. 7A and 7B, it is observed that in the state of connection the dolly 14 is located adjacent to the inner face of the connection-separation device 1.

The connection/separation device 1 of the invention has a significant reduction of mass with respect to prior devices. For example, a 1666 mm diameter band made with the above mentioned system known as LPSS weighs about 23.2 kg, while it would weigh 2.7 kg with the system of the invention. In the case of a diameter of 380 mm, the device of the invention would weigh approximately 750 g. This makes it a very convenient system when high load capacity is not required, for example, for microsatellites and mini-satellites.

It is especially applicable to these types of missions:

Missions in which weight is a critical factor.

Small satellites (low weight and small diameter interface).

Satellites with low weight (less than 1 ton) but with a large diameter interface, in which the separation system coexists with the satellite during a large part of the mission. In these cases the band tension should not be too high (<20 kN).

While the present invention has been described in connection with preferred embodiments, it is apparent that modifications within its scope may be introduced, and should not be limited to such embodiments, but only to the content of the following claims.

The invention claimed is:

1. Connection-separation device for separating satellites from launchers or from satellite dispensers comprising:
    a plurality of circumferentially aligned clamps which are coupled on an inner face on rings of separable elements constituting a union interface between the two separable elements, and
    a release mechanism connecting two first clamps of the plurality of clamps through one end of said first clamps, wherein the two first clamps connected by the release mechanism comprise a protrusion protruding from outer faces at an end opposite the end connecting with the release mechanism, and wherein second clamps of the plurality of clamps which are unconnected by the release mechanism comprise a protrusion protruding from outer faces at each end adjacent the adjacent second clamps, so that each pair of second clamps adjacent and unconnected to one another by the release mechanism are connected to one another by connectors connecting said protrusions:

wherein each first clamp comprises a conical recess facing radially outward and in an outer face of an end opposite the end comprising a protrusion; and wherein the release mechanism comprises a release element, a bridge with a pair of conical protrusions, a bolt and a dolly, wherein in the connection state the release element holds the bolt, the conical protrusions of the bridge are accommodated in the conical recesses of the first clamps, and the dolly is positioned adjacent the inner face of the connection-separation device.

2. Connection-separation device for separating satellites from launchers or from satellite dispensers according to claim 1, wherein the protrusions of the ends of the clamps have a through-hole and the connectors are tangentially arranged screw and nut systems passing through said through holes to connect the corresponding adjacent clamps.

3. Connection-separation device for separating satellites from launchers or from satellite dispensers according to claim 1, further comprising a plurality of devices separated angularly from each other and connected to one of the rings of the separable elements for receiving the clamps when the connection-separation device is released.

4. Connection-separation device for separating satellites from launchers or from satellite dispensers according to claim 1, comprising at least one filler element in a gap between protrusions to provide continuity.

5. Connection-separation device for separating satellites from launchers or from satellite dispensers according to claim 1, wherein the clamps have an internally hollow cross-section.

6. Connection-separation device for separating satellites from launchers or from satellite dispensers according to claim 1, wherein the clamps comprise an area with grid-shaped holes.

7. Connection-separation device for separating satellites from launchers or from satellite dispensers according to claim 1, wherein the clamps have recessed areas on the outer face and proximate the protrusions, capable of receiving the connectors.

8. Connection-separation device for separating satellites from launchers or from satellite dispensers according to claim 1, wherein the release element comprises a material with shape memory SMA used as an actuator of the separation.

9. Connection-separation device for separating satellites from launchers or from satellite dispensers according to claim 1, wherein the release element is a pyrotechnic element.

* * * * *